(12) United States Patent
Stephens et al.

(10) Patent No.: US 10,301,028 B2
(45) Date of Patent: May 28, 2019

(54) SLIDING TRAY TABLE WITH STORAGE COMPARTMENT

(71) Applicant: B/E Aerospace, Inc., Wellington, FL (US)

(72) Inventors: Benjamin D. Stephens, Marietta, GA (US); Robert D. Wilkey, Atlanta, GA (US); Robert J. Henshaw, Newnan, GA (US); Francis Xavier L. Garing, Atlanta, GA (US); Alexander Nicholas Pozzi, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/788,516

(22) Filed: Oct. 19, 2017

(65) Prior Publication Data

US 2018/0281967 A1    Oct. 4, 2018

Related U.S. Application Data

(60) Provisional application No. 62/481,165, filed on Apr. 4, 2017.

(51) Int. Cl.
*B64D 11/00* (2006.01)
*B64D 11/06* (2006.01)

(52) U.S. Cl.
CPC .... *B64D 11/0638* (2014.12); *B64D 11/00152* (2014.12); *B64D 11/0636* (2014.12)

(58) Field of Classification Search
CPC ............................ B60N 3/004; B64D 11/0638; B64D 11/0015; B64D 11/00152; B64D 11/0624; A47C 7/70

USPC ............... 108/25, 42, 44; 297/188.21, 157.1, 297/158.2, 158.4, 162, 163, 173
See application file for complete search history.

(56) References Cited

U.S. PATENT DOCUMENTS

| | | | | |
|---|---|---|---|---|
| D144,859 S | * | 5/1946 | McKenzie | ...................... 108/25 |
| 2,623,435 A | * | 12/1952 | Geis | ........................ B60R 11/00 |
| | | | | 108/3 |
| 2,685,486 A | * | 8/1954 | Woller | ................. A47B 23/046 |
| | | | | 108/3 |

(Continued)

FOREIGN PATENT DOCUMENTS

| | | | |
|---|---|---|---|
| DE | 3723027 | * | 9/1988 |
| DE | 202012105089 | * | 12/2018 |
| EP | 1683719 | * | 7/2006 |

(Continued)

OTHER PUBLICATIONS

CN 203255005; abstract and figure (Year: 2013).*

*Primary Examiner* — Janet M Wilkens
(74) *Attorney, Agent, or Firm* — Clements Bernard Walker PLLC

(57) ABSTRACT

An aircraft tray table assembly includes a recessed storage compartment covered by a pivoting lid which becomes an integral part of the tray table surface upon closing. A mirror may be fixedly attached to the inside of the lid. A passenger may be provided a mirror surface by flipping open the pivoting lid when positioned in a passenger seat within an aircraft. A retractor may be configured to closing of the pivoting lid when a passenger manually translates the tray table into a stowed position, thereby avoiding contact of the deployed lid with aircraft fixture surfaces proximate the stowed position of the tray table.

16 Claims, 7 Drawing Sheets

(56) References Cited

U.S. PATENT DOCUMENTS

| | | | | |
|---|---|---|---|---|
| 2,733,110 A * | 1/1956 | Berner | A47B 23/046 | 108/25 |
| 2,742,336 A * | 4/1956 | Holmberg | A47B 23/046 | 108/3 |
| 3,795,422 A * | 3/1974 | Robinson | A47C 7/70 | 244/122 R |
| 4,521,021 A * | 6/1985 | Dixon | A63F 11/00 | 108/28 |
| 5,370,060 A * | 12/1994 | Wang | B60N 3/004 | 108/149 |
| 9,403,596 B2 * | 8/2016 | Pajic | B64D 11/0638 | |
| 9,701,409 B2 * | 7/2017 | Valdes | B64D 11/0015 | |
| 2003/0184957 A1 * | 10/2003 | Stahl | B60N 3/004 | 361/679.1 |
| 2008/0072803 A1 * | 3/2008 | Korber | A47B 21/00 | 108/50.01 |
| 2010/0252680 A1 * | 10/2010 | Porter | B60N 2/01 | 244/118.6 |
| 2013/0070171 A1 * | 3/2013 | Boyer, Jr. | H04N 5/655 | 348/837 |
| 2013/0093220 A1 * | 4/2013 | Pajic | A47C 7/70 | 297/163 |
| 2013/0314861 A1 * | 11/2013 | Burford | H05K 7/00 | 361/679.01 |
| 2013/0327255 A1 * | 12/2013 | Pajic | A47B 23/00 | 108/25 |
| 2014/0124641 A1 * | 5/2014 | Kassanoff | A47B 17/04 | 248/447 |
| 2014/0167457 A1 * | 6/2014 | Schultheis | B64D 11/06 | 297/162 |
| 2015/0020715 A1 * | 1/2015 | Pajic | B64D 11/00152 | 108/3 |
| 2015/0061327 A1 * | 3/2015 | Millan | B60N 3/004 | 297/163 |
| 2015/0068434 A1 * | 3/2015 | Pajic | A47B 23/00 | 108/25 |
| 2017/0071375 A1 * | 3/2017 | Smith | A47G 11/004 | |
| 2017/0283067 A1 * | 10/2017 | Darbyshire | B64D 11/0638 | |

FOREIGN PATENT DOCUMENTS

| | | | |
|---|---|---|---|
| FR | 2911553 | * | 7/2008 |
| GB | 433816 | * | 8/1935 |
| GB | 2554437 | * | 4/2018 |
| WO | 0002745 | * | 1/2000 |
| WO | 2013055671 | * | 4/2013 |
| WO | 2014075040 | * | 5/2014 |

* cited by examiner

SLIDING TRAY TABLE WITH STORAGE COMPARTMENT

CROSS-REFERENCE TO RELATED APPLICATIONS

This application claims priority to U.S. Provisional Patent Application Ser. No. 62/481,165, entitled "Sliding Tray Table with Storage Compartment," filed Apr. 4, 2017, the contents of which are incorporated by reference in their entirety.

This application incorporates by reference, in their entirety, the following prior patent applications by B/E Aerospace, Inc. directed to personal electronic device holders for airplane passenger seats: PCT application No. PCT/US17/20048 entitled "Tray Table with Adjustable Media Support Surface," filed Feb. 28, 2017; U.S. patent application Ser. No. 15/066,385 entitled "Seat Back Personal Electronic Device Holder," filed Mar. 10, 2016 and issued as U.S. Pat. No. 9,776,722 on Oct. 3, 2017; U.S. patent application Ser. No. 15/174,242, entitled "Deployable Seatback Holder for Portable Electronic Devices," filed Jun. 6, 2016; U.S. patent application Ser. No. 14/667,133, entitled "Deployable Center Console Shelf," filed Mar. 24, 2015; U.S. patent application Ser. No. 13/368,532 entitled "Tablet Holder and Tablet Stowage System," filed Feb. 8, 2012 and issued as U.S. Pat. No. 8,665,584 on Mar. 4, 2014; and U.S. Design patent application Ser. No. 29/545,717 entitled "Passenger Tray Table," filed Nov. 16, 2015 and issued as U.S. Design Pat. No. D766,610 on Sep. 20, 2017. Further, this application incorporates by reference, in their entireties, U.S. patent application Ser. No. 12/100,702 entitled "Adjustable Bi-Fold Tray Table," filed Apr. 10, 2008 issued as U.S. Pat. No. 7,506,923 on Mar. 24, 2009, and U.S. patent application Ser. No. 14/639,436 entitled "Laterally-Expanding Tray Table," filed Mar. 5, 2015 and issued as U.S. Pat. No. 9,573,687 on Feb. 21, 2017, each of which describes tray table mounting apparatus. All above identified applications are hereby incorporated by reference in their entireties.

BACKGROUND

Conventional tray tables typically extend the width of a seat back, and are moveable between a stowed position flush with and latched to the seat back of a seat and a deployed position with the tray table extending away from the seat back in a generally horizontal position for use by an aft-seated occupant. Other well-known designs include bi-fold tray tables that are hinged in the middle and are typically stowed in a folded configuration in an armrest. To deploy the table, the arm cap is raised, the table pivoted out of a storage cavity in the armrest, pivoted laterally across the lap of the seat occupant, after which the table is unfolded at the hinge to form a full width tray table.

Electronic media devices, such as tablet computers, smart phones, handheld gaming devices, e-readers, and other portable electronic devices (PEDs) are becoming more commonplace due to the increased needs for portable computing, remote communication and access to media content. The use of electronic media devices has increased substantially since the Federal Aviation Administration liberalized the use of portable electronic devices such as laptop computers, tablets, and phones during most phases of aircraft flight.

While designed to be easily held for touchscreen use, most PEDs lack a mounting structure or structure to mount thereto to securely maintain the device for prolonged use or for hands-free interaction. This is particularly disadvantageous when using a PED in a vehicle such as an airplane, train or car where the PED may be used, in part, as a replacement for a permanently-mounted dedicated video monitor.

There is a need for a more secure manner of holding the devices in a use position while minimizing the possibility of the device falling onto the aircraft deck or into space occupied by another passenger. For this reason, the tray table of this application includes features intended to more securely hold portable electronic devices during use, while also providing for additional uses of the tray table, such as for holding a meal tray or a beverage cup.

SUMMARY OF ILLUSTRATIVE EMBODIMENTS

In an illustrative embodiment, a multi-use aircraft tray table with a recessed storage compartment covered by a pivoting lid which becomes an integral part of the tray table surface when closed. A mirror may be fixedly attached to the inside of the lid. In an illustrative example, a passenger may be provided a mirror surface by flipping open the pivoting lid when positioned in a passenger seat within an aircraft. An automatic closing mechanism (retractor) may be configured to close the lid when a passenger pushes the tray table away, thereby avoiding contact of the deployed lid with aircraft fixture surfaces proximate a stowing position of the tray table.

Various embodiments may achieve one or more advantages. For example, in some embodiments, the tray table may prepare itself for stowage, automatically protecting itself from damage. In some examples, the tray table may aid a passenger in getting prepared for an appointment, for example, in applying makeup or performing other grooming activities. In some embodiments, the tray table may provide hands-free viewing of a portable electronic device.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
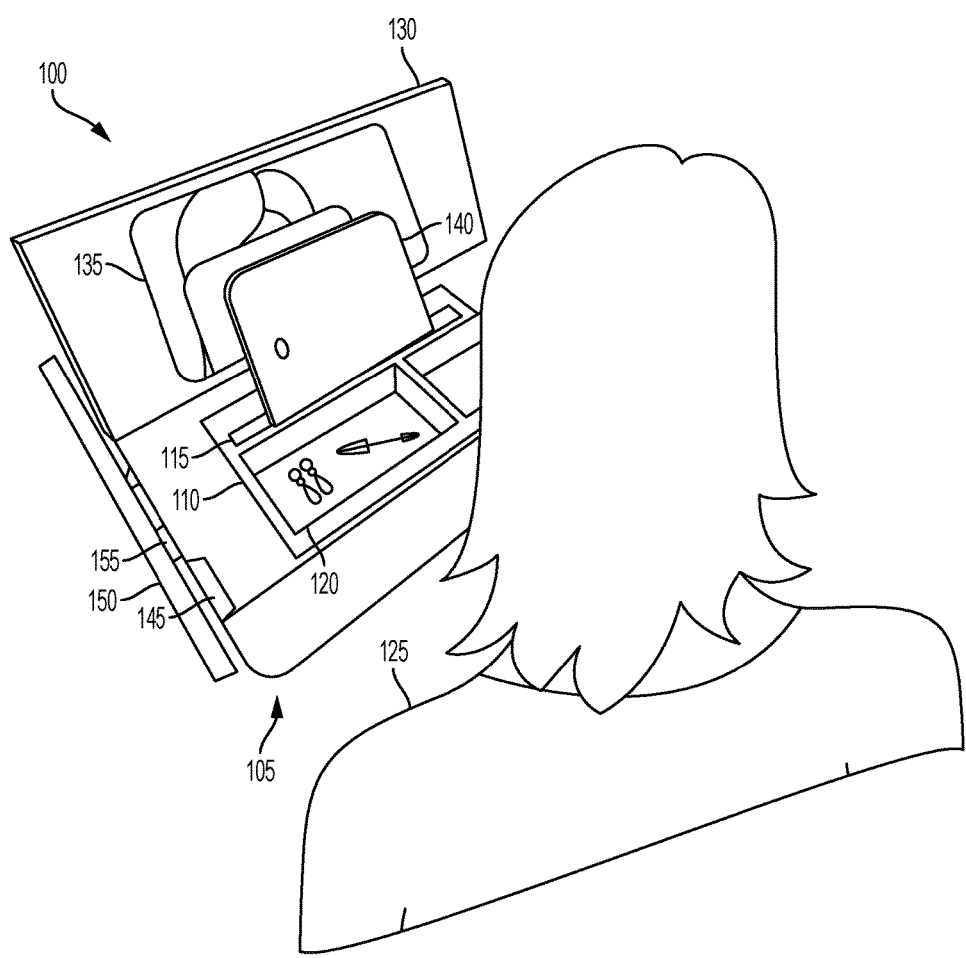
FIG. 1 depicts a perspective view of an exemplary multi-use aircraft tray table assembly in use by a passenger.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 depicts a perspective view of an exemplary multi-use aircraft tray table in use by a passenger. A multi-use aircraft tray table assembly 100 includes a tray table enclosure 105, which may be operated, for example, by a person seated in an assigned passenger seat. In some implementations, the tray table enclosure 105 may include a storage compartment 110 with a portable electronic device (PED) holder slot 115 and one or more compartment wells 120. In an illustrative example, the compartment wells 120 may be employed by a passenger 125 to store small personal effects during a flight, such as writing utensils, jewelry, headphones, or small electronic devices. In some examples, the storage compartment 110 may be accessed by flipping up a pivoting cover 130 that is hingedly coupled to the tray table enclosure 105. In addition, the pivoting cover 130 may be configured to support a mirror 135 mounted to an inside surface of the pivoting cover 130 such that the passenger 125 is able to view and utilize the mirror 135 when the pivoting cover 130 is in an open position. In some implementations, an open position of the pivoting cover 130 corresponds to a position where the pivoting cover 130 is rotated into a substantially upright position such that an upper surface of the pivoting cover is adjacent to a seatback of an adjacent seat forward of the passenger 125. For example, the mirror 135 may be utilized by the passenger 125 to view a reflected image of his or her face and upper body region while seated in an assigned airline seat.

In some implementations, the passenger 125 may also employ the PED holder slot 115 to hold a PED 140 when the pivoting cover is in the open position. In some examples, the tray table enclosure 105 may incorporate a finger lift cavity 145 configured to allow the passenger 125 to manipulate the pivoting cover 130 from a closed position to an open position. For example, the finger lift cavity 145 may be disposed on a side edge of the tray table enclosure 105 and may be a groove and may be sized to allow a finger of the passenger 125 to fit within the finger lift cavity 145 to allow the passenger to place one or more fingers beneath the pivoting cover 130 to assist with moving the pivoting cover 130 from the closed position to the open position.

In some implementations, to translate the tray table enclosure 105 toward the passenger 125 into an extended position, the tray table enclosure 105 may be guided by a tray slide 150. For example, a tray coupler 155 may couple the tray table enclosure 105 to the tray slide 150 and slidably engages the tray slide 150 as the tray table enclosure 105 moves between an extended position (e.g., toward the passenger 125) and a retracted (e.g., away from the passenger 125) position. For example, an inner surface of the tray slide 150 may include a guide slot or groove that forms a track configured to receive the tray coupler 155 that translates along the track as the tray table enclosure 105 moves between the retracted and extended positions. In some examples, the retracted position may be referred to as a stowage position, and the extended position may be referred to as a use position. In addition, the tray coupler 155 may be fixedly coupled to the tray table enclosure 105 such that the tray table enclosure 105 cooperatively moves with the tray coupler 155 as the tray coupler 155 slidably translates along the tray slide 150. In some implementations, the tray slide 150 may be disposed on one or both sides of the tray table enclosure 105.

In an exemplary use of the tray table enclosure 105 as a table surface, the pivoting cover 130 may be hinged closed such that an upper surface of the pivoting cover 130 may advantageously provide a substantially smooth upper surface across the top of the tray table enclosure 105 to allow the passenger to place items on the upper surface of the pivoting cover 130. In some implementations, when in the closed position, an inner or lower surface of the pivoting cover 130 may abut or rest on an upper compartment surface of the tray table enclosure 105 into which the storage compartment 110 including the PED slot holder 115 and compartment wells 120 is formed such that the pivoting cover 130 covers or hides the storage compartment 110 from view.

In an exemplary use as a vanity mirror and/or a storage compartment, the pivoting cover 130 may be hinged open to advantageously provide access to the mirror 135, the compartment wells 120, and the PED holder slot 115. In operation, the passenger 125 may pull the tray table enclosure 105 toward himself or herself, guided by the tray slide 150, to extend the tray table enclosure 105 into a deployed, extended, position for use. To stow the tray table enclosure 105, the passenger 125 may push the tray table enclosure 105 away from himself or herself to move the tray table enclosure 105 to the retracted position. In other implementations, the passenger may position the tray table enclosure 105 in an intermediate, partially extended position along the tray slide 150 between the extended and retracted positions.

In various embodiments, the pivoting cover 130 may automatically transition from an open position to a closed position by operation of an automatic closing mechanism (retractor), examples of which will be described in more detail with reference, for example, at least to FIGS. 5-7. The automatic closing mechanism of the pivoting cover 130 may advantageously prevent or reduce a severity of collisions between the pivoting cover 130 and other items located on or adjacent to an aircraft seatback or other tray table mounting surface within the vicinity of the tray table assembly such as, in some examples, a video display unit and/or an audio speaker.

In an illustrative example, the passenger 125 may manually lift the pivoting cover 130 from an upper surface of the tray table enclosure 105, aided by the finger lift cavity 145. In some examples, the passenger 125 may manually rotate the pivoting cover 130 between the open and closed positions. The pivoting cover 130 may pivot on a friction hinge, which may advantageously provide user-adjustability of an orientation angle of the pivoting cover 130. In one example, the passenger 125 may advantageously employ the mirror 135 mounted to the inner surface of the pivoting cover 130 by rotating the pivoting cover 130 upward to the open position, for example, to prepare his or her appearance for a meeting upon reaching a travel destination. In some implementations, the passenger 125 may also rotate the pivoting cover 130 to the open position to employ the compartment wells 120 to hold small items, for example, a pen or stylus, earrings and/or makeup application tools.

The mirror 135 may, in some implementations, be constructed of a substantially reflective surface, which may be formed of a lightweight, metallic film. To mitigate or block potential glare from sunlight reflecting on the surface of the mirror 135 from affecting other passengers, a baffle may be disposed on one or more sides of the mirror 135 that may be configured to fold out from one or both of the sides of the mirror 135. Such opaque baffles (e.g., fabric, plastic) may effectively block sunlight coming through the aircraft window and reflecting off the mirror 135.

In some implementations, electric power may be supplied to the tray table enclosure 105 via one or more electric power connections within the storage compartment 110, by cabling running through the guide rails 150. In some examples, one or more charging ports may be provided within the storage compartment 110, such as within the compartment wells 120 and/or PED holder slot 115, or along one or more edges and/or surfaces of the tray table enclosure 105 for supplying charge to a PED 140 or other electronic device. Some embodiments may provide standard charging connectors integrally connected to the tray table enclosure 105 so that the passenger 125 can directly charge a PED without needing to supply any additional external cables or adapters. Some implementations may provide a wireless charging capability by which a PED may be receive inductive charging by simply laying the PED on a prescribed portion of the tray table enclosure 105 or in the storage compartment 110. For example, a coil antenna and circuitry associated with a wireless power transmitter may be disposed within a surface of the storage compartment 110 to provide the wireless charging capability. Some embodiments may provide more than one power port, for example, to charge wireless headphones while they are being used by the passenger so that passengers may simultaneously operate their PEDs and accessories (e.g., headphones) while increasing the charge on their devices. Some ports on the tray table enclosure 105 may provide, for example, high bandwidth wired access to an onboard router for business data, voice, and/or streaming applications, for example.

In some embodiments, the pivoting cover 130 may be configured to open only when the tray table enclosure 105 is slid toward the passenger 125 along the tray slide 150 into the extended position. In such embodiments, the pivoting cover 130 may be held in the closed position by a closing mechanism (retractor) within the tray table enclosure 105 until the tray table enclosure 105 reaches the extended position. In some examples, when the passenger 125 slides the tray table enclosure 105 toward himself or herself while the pivoting cover 130 is in the open position, the passenger 125 may be able to close the pivoting cover 130 without sliding the tray table enclosure 105 away from himself or herself toward the retracted position. In various examples, prior to sliding the tray table enclosure 105 toward the extended position with the pivoting cover 130 in an open position, the passenger 125 may slide the tray table enclosure 105 away from themselves in the direction of the retracted position (e.g., toward a seatback), which may activate the closing mechanism within the tray table enclosure 105 to automatically close the pivoting cover 130.

In an illustrative embodiment, the passenger 125 may utilize the PED holder slot 115 of the storage compartment 110 to position a PED 140 such that the passenger 125 can view a screen of the PED 140 without having to hold the PED 140 or prop or rest the PED 140 against another object, which can be referred to as hands-free operation in an example. In some implementations, the PED holder slot 115 may be configured to receive an edge of the PED 140 and is able to provide support to the PED 140 in a substantially upright position within the PED holder slot 115. In some illustrative embodiments, the surfaces of the PED holder slot 115 may be lined with a soft, non-abrasive material to prevent to a PED 140 inserted into the PED holder slot 115, such as a fabric or foam. In other examples, the PED holder slot 115 may be lined with a retaining material, such as a rubberized material, to avoid slippage of the PED 140 within the PED holder slot 115.

Figure 2:
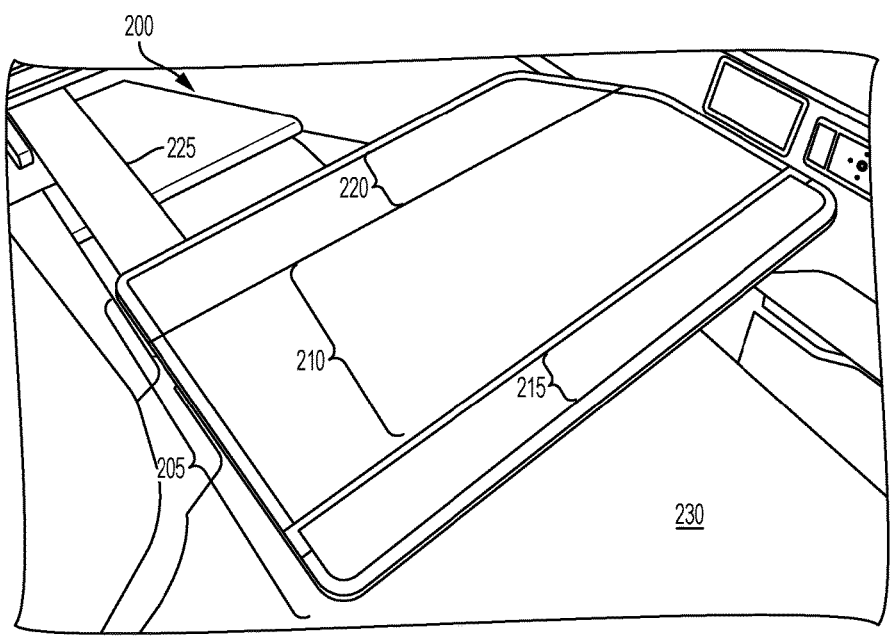
FIG. 2 depicts a perspective view of an exemplary multi-use aircraft tray table assembly with the pivoting lid closed, employed as a table surface.

Turning to FIG. 2, a perspective view of an exemplary multi-use aircraft tray table assembly 200 with a storage lid 210 in a closed position is illustrated. The multi-use aircraft tray table assembly 200 may be an implementation of the multi-use tray table assembly 100 described above. For example, the multi-use tray table assembly 200 may include the components of the storage compartment 110 (e.g., PED holder slot 115, compartment wells 120). In some implementations, the multi-use aircraft tray table assembly 200 may include a tray surface 205 in which at least a portion of the tray surface 205 includes a storage lid 210. In some examples, the storage lid 210 may extend across an entire lateral width of the multi-use aircraft tray table assembly 200 and across at least a portion of a length of the tray surface 205. In some examples, a remaining portion of the length not included as part of the storage lid 210 may be made up of a front table surface 215 and a rear table surface 220. In another example, the storage lid 210 may extend across the entire length of the tray surface 210. In some aspects, the tray surface may include one of the front table surface 215 or rear table surface 220 in addition to the storage lid 210. In some examples, the storage lid 210 may operate in a substantially similar way as the pivoting lid 130 (FIG. 1) described above.

In some implementations, the multi-use aircraft tray table assembly 200 may be supported by, and slidably engaged with a support arm 225. In some implementations, to translate the tray table enclosure 105 toward the passenger 125 into an extended position, the tray table enclosure 105 may be guided by the support arm 225, which may include a guide slot or track that engages an edge of the tray surface 205 so that the tray table assembly 200 can translate between the extended and retracted positions. In some implementations, the tray table assembly 200 may include a support arm 225 disposed on one or both sides of the tray surface 205.

In an illustrative example, the multi-use aircraft tray table 200 may slide toward a seat 230 to an extended position as well as away from the seat 230 toward a retracted position. In some examples, sliding the multi-use aircraft tray table 200 toward the extended position may cause the storage lid 210 to unlatch, and may advantageously allow a passenger to open the lid in order to employ features under the storage lid 210, which may include a mirror and/or storage compartments as described above. In some examples sliding the multi-use aircraft tray table 200 away from the seat 230 toward the retracted position may cause the storage lid 210 to latch or lock in the closed position, and may advantageously protect adjacent aircraft fixtures from collisions with the storage lid 210. In further examples, when the multi-use aircraft tray table 200 is slid away from the seat 230 toward the retracted position with the storage lid 210 opened, a closing mechanism (retractor) for the storage lid 210 within the multi-use aircraft tray table 200 may automatically close and/or latch the storage lid 210 in the closed position.

Figure 3:
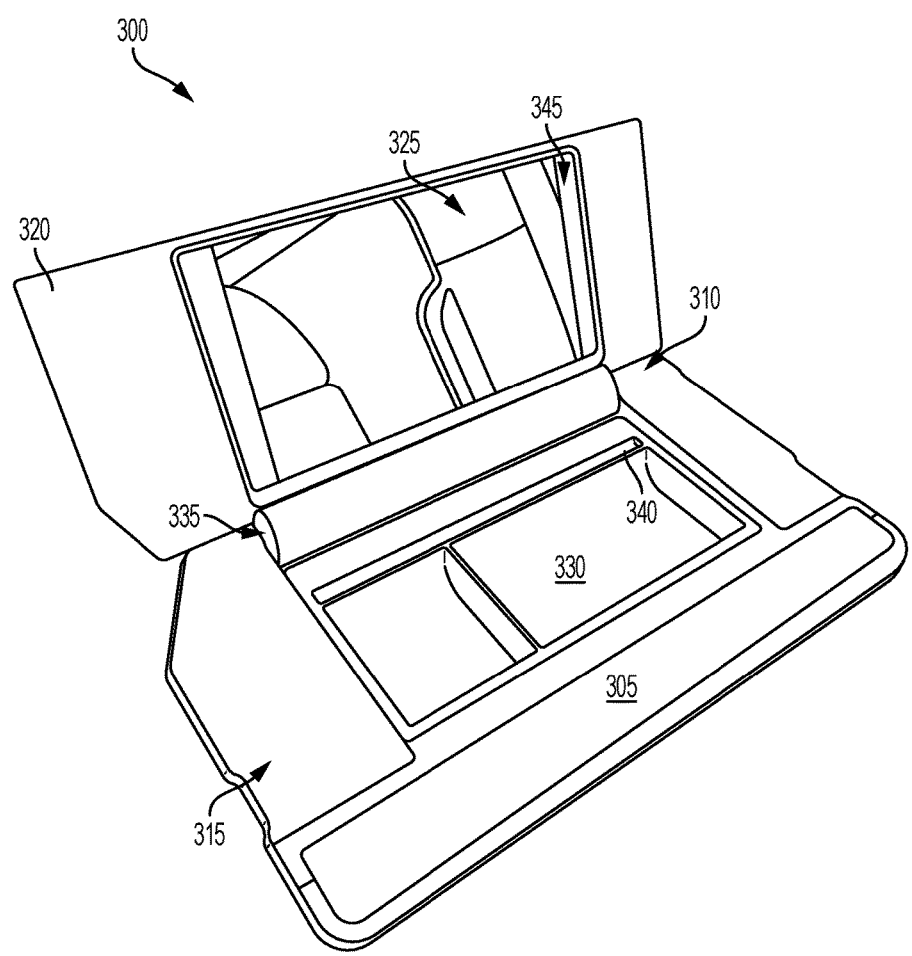
FIG. 3 depicts a perspective view of an exemplary multi-use aircraft tray table assembly with the pivoting lid open, employed as a vanity mirror.

FIG. 3 depicts a perspective view of an exemplary multi-use aircraft tray table assembly 300 with a pivoting lid 320 in an open position such that a vanity mirror 325 can be employed by a passenger facing the mirror 325. In some implementations, the multi-use aircraft tray table assembly 300 may include a front table surface 305 that may not be a part of the pivoting lid 320. In some examples, the front table surface 305 may be padded in order to provide wrist comfort and/or pain relief for users of computer mice and/or keyboard, for example. In some examples, the multi-use aircraft tray table assembly 300 may also include a rear table surface 310, extending laterally across an entire width of the multi-use aircraft tray table assembly 300. In some implementations, at least one of the front table surface 305 and the rear table surface 310 may be slightly raised above an upper surface of the pivoting lid 320 in the closed position in order to engage a pivoting lid 320, presenting a contiguous table surface as illustrated in FIG. 2. The closed pivoting lid 320 may provide a substantially flat and continuous surface across an upper surface of the multi-use aircraft tray table assembly 300.

When the pivoting lid 320 is raised and rotated toward an open position, an upper surface of a tray table enclosure 315 may be exposed. In some implementations, the upper surface of a tray table enclosure 315 may include an inset multi-compartment tray 330, which may include a PED holder groove 340. In some examples, the PED holder groove 340 may be slanted at an advantageous angle for PED viewing from a horizontal axis. In various examples the PED holder groove 340 may articulate via a thumb lever so that an orientation angle of the PED holder groove 340 may be adjusted in order to adjust the viewing angle for the PED. In some implementations, the pivoting lid 320 may include a curved pivot arm 335 that may be a friction hinge. In some examples, the mirror 325 is fixedly mounted to an inner surface of the pivoting lid 320 and may be abutted by a set of vanity illumination elements 345 disposed around a periphery of the mirror 325. In various embodiments, the vanity illumination elements 345 may be integrated on one or more edges of the mirror 325.

Figure 4:
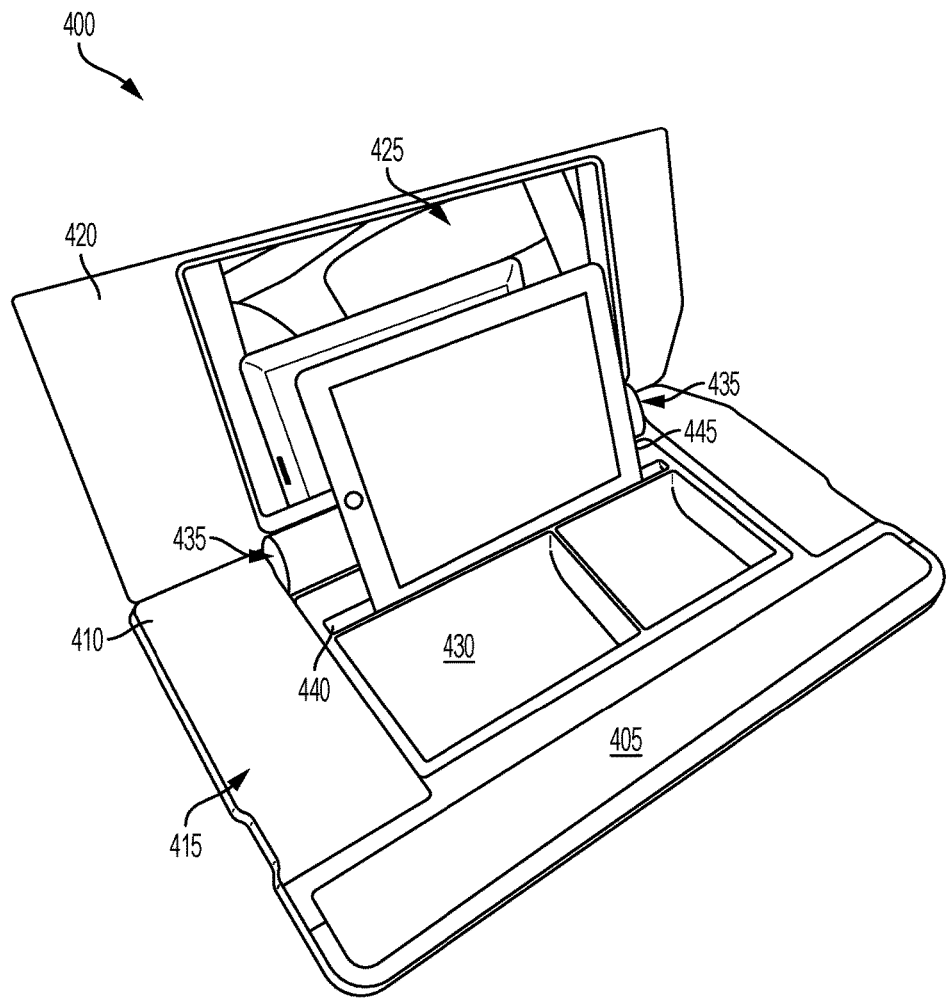
FIG. 4 depicts a perspective view of an exemplary multi-use aircraft tray table assembly with the pivoting lid opened, employed as a portable electronic device holder.

FIG. 4 depicts a perspective view of an exemplary multi-use aircraft tray table assembly 400 with a pivoting lid 420 in an open position such that the tray table assembly 400 may be employed as a PED holder. In some implementations, the multi-use aircraft tray table assembly 400 may include a front table surface 405 disposed across a lateral width of the tray table assembly 400 adjacent to an edge of the tray table assembly 400 that is closest to a passenger when the tray table assembly 400 is deployed. In some examples, the multi-use aircraft tray table assembly 400 may also include a rear table surface 410, extending laterally across the entire multi-use aircraft tray table assembly 400 width adjacent to an edge of the tray table assembly 400 that is furthest from a seated passenger when the tray table assembly 400 is in the deployed position.

In some implementations, sandwiched between the front table surface 405 and the rear table surface 410, as shown in FIG. 4, is a upper surface of the tray table enclosure 415. In some examples, an inner surface of the pivoting lid 420 may abut and rest against the upper surface of the tray table enclosure 415 when the pivoting lid 420 is in the closed position. In addition, the upper surface of the tray table enclosure 415 may be exposed when the pivoting lid 420 is pivoted away from the compartment table surface 415 toward the open position. In some examples, the pivoting lid 420 may hingedly coupled to the multi-use aircraft tray table assembly 400 along a rear edge that may be adjacent to a seatback of a forward adjacent seat. In some implementations, a mirror 425 may be fixedly coupled to an inner surface of the pivoting lid 420. In some implementations, a multi-well compartment 430 may be fixedly coupled and disposed within the upper surface of the tray table enclosure 415 such that the multi-well compartment 430 may be inset within the lower main table surface 415. In some examples, the multi-well compartment 430 may be removably inserted into the upper surface of the tray table enclosure 430. In another implementation, the multi-well compartment 430 may be integrally formed into the upper surface of the tray table enclosure 415 during the manufacturing process. In some implementations, the pivoting lid 420 may also include a curved pivot arm 435 disposed along a rear edge of the tray table assembly 400 that may allow the pivoting lid 420 to rotate about a horizontal axis between open and closed positions.

In some implementations, the multi-well compartment 430 may include an integrated PED holder 440, which may be a groove or slot configured to hold multiple types of PEDs such as an exemplary PED 445 shown in FIG. 4. In some examples, the PED holder 440 may provide the passenger variable and/or adjustable viewing angles for the PED 445, which may in some embodiments provide for a manually controlled backwall orientation angle adjustment within the PED holder 440. In such embodiments, a passenger may manually articulate a viewing angle lever or thumb knob on one side of the PED holder 440. The lever may articulate an orientation angle of the backwall structure of the PED holder 440 in forward and aft directions, articulating the PED 445 to an advantageous viewing angle for the passenger. In some examples the articulating wall may also advantageously provide an adjustable width slot to accommodate PEDs of variable widths or encased in thick PED cases.

In some examples, the curved pivot arm 435, also referred to as a hinge 435, may extend below the upper surface of the tray table enclosure 415 and may be coupled to a pivoting lid closing mechanism (retractor) within the multi-use aircraft tray table assembly 400 (e.g., closing drive arm 540 shown in FIG. 5). In various examples, the curved pivot arm 435 may extend laterally across the bottom edge of the pivoting lid 420 that is furthest from a seated passenger facing the tray table assembly 400 such that the pivoting lid 420 pivots away from the seated passenger as the pivoting tray 420 is moved from the closed position to the open position. In some examples the curved pivot arm 435 may extend for only a portion of the lateral bottom edge of the pivoting lid 420. In some embodiments, the curved pivot arm 435 may be non-continuous, positioned at two or more locations along the lateral bottom edge of the pivoting lid 420.

In some examples, the mirror 425 may include an integrated lighting surface. The integrated lighting surface may be, for example, electroluminescent (EL), and may advantageously provide a modern looking integrated flat surface. In some examples, the lighting surface may employ LED technology, which may advantageously provide a cost-effective solution. In some examples, a LED lighting surface for the mirror 425 may provide the user with an adjustable light intensity which may advantageously aid a user in applying makeup and/or observing various features of the face. In some examples the LED lighting surface may also provide colored light variations. Various embodiments may include user controls for the passenger to adjust intensity and/or color output of the lighting surface of the mirror 425.

Figure 5:
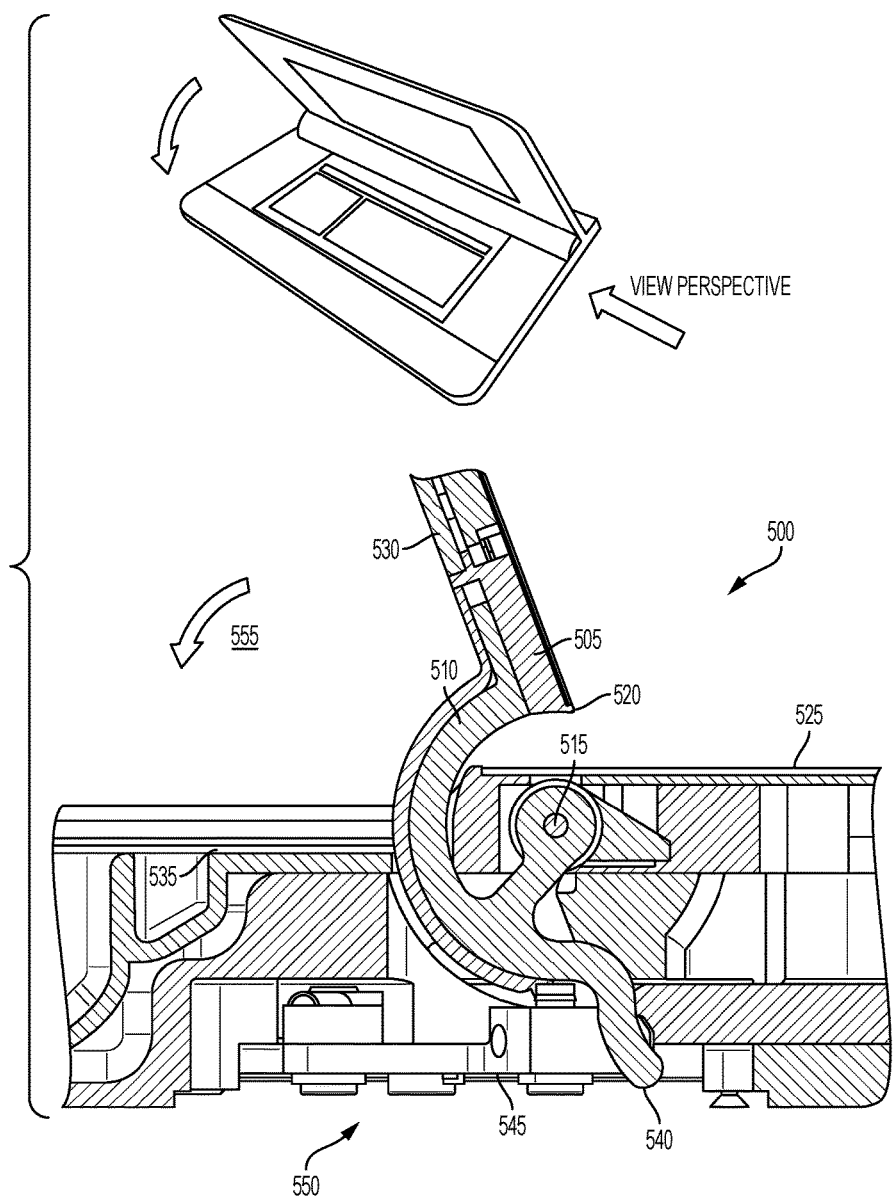
FIG. 5 depicts a cross-sectional elevation view of an exemplary multi-use aircraft tray table assembly, illustrating an automatic lid closing mechanism in the open state.

Turning to FIG. 5, a cross-sectional elevation view of an exemplary multi-use aircraft tray table assembly 500 is depicted, illustrating an automatic lid closing mechanism (retractor) in an open position. For example, FIG. 5 shows a magnified view of an articulating or pivoting lid 505 that may be a part of the multi-use aircraft tray table assembly 500. The pivoting lid 505 may be fixedly coupled to a cylindrical hinge 510 that may be configured to pivot or rotate about an axis of rotation 515, allowing the pivoting lid 505 to rotate between open and closed positions. In some implementations, the axis of rotation 515 may extend laterally across a width of the multi-use aircraft tray table assembly 500. In some examples, the cylindrical hinge 510 may be integrated with a cover closing drive arm 540 that may extend from the cylindrical hinge 510 toward a lower surface of the tray table assembly 500 and contact a cantilever subassembly 545 (pivoting arm) of a closing mechanism 550, which may be configured to cause rotation of the cylindrical hinge 510, thereby causing the pivoting lid 505 to rotate toward the closed position. In operation, the cover closing drive arm 540 may be forced to the right (with respect to FIG. 5) by the cantilever subassembly 545 which drives the cylindrical hinge 510 counterclockwise (with respect to FIG. 5). In some examples, the cantilever subassembly 545 is part of a closing mechanism 550 (retractor) as described in detail further below. In operation, when the closing mechanism 550 drives the pivoting lid 505 closed, the pivoting lid 505 may be driven in a direction of arrow 555 toward the closed position.

In some implementations, the pivoting lid 505 may include a lid stop edge 520 disposed along a bottom lateral edge of the pivoting lid 505. When articulating from the closed position to the open position, the pivoting lid 505 may travel clockwise (with respect to FIG. 5) until the lid stop edge 520 meets, aligns with, or makes contact with a back-table surface 525. In some examples, the back-table surface defines a boundary for a maximum amount of rotation of the pivoting lid 505 in an open direction. In an illustrative example, and for context, the multi-use aircraft tray table 500 includes a mirror 530, and a storage compartment 535 disposed within a upper surface of the tray table enclosure of the tray table assembly 500. When in the closed position, an inner surface of the pivoting lid 505 may rest against an upper surface of the upper surface of the tray table enclosure. In some examples, the upper surface of the tray table enclosure may define a maximum amount of rotation of the pivoting arm 505 in a direction of the closed position (e.g., direction 555)

Figure 6:
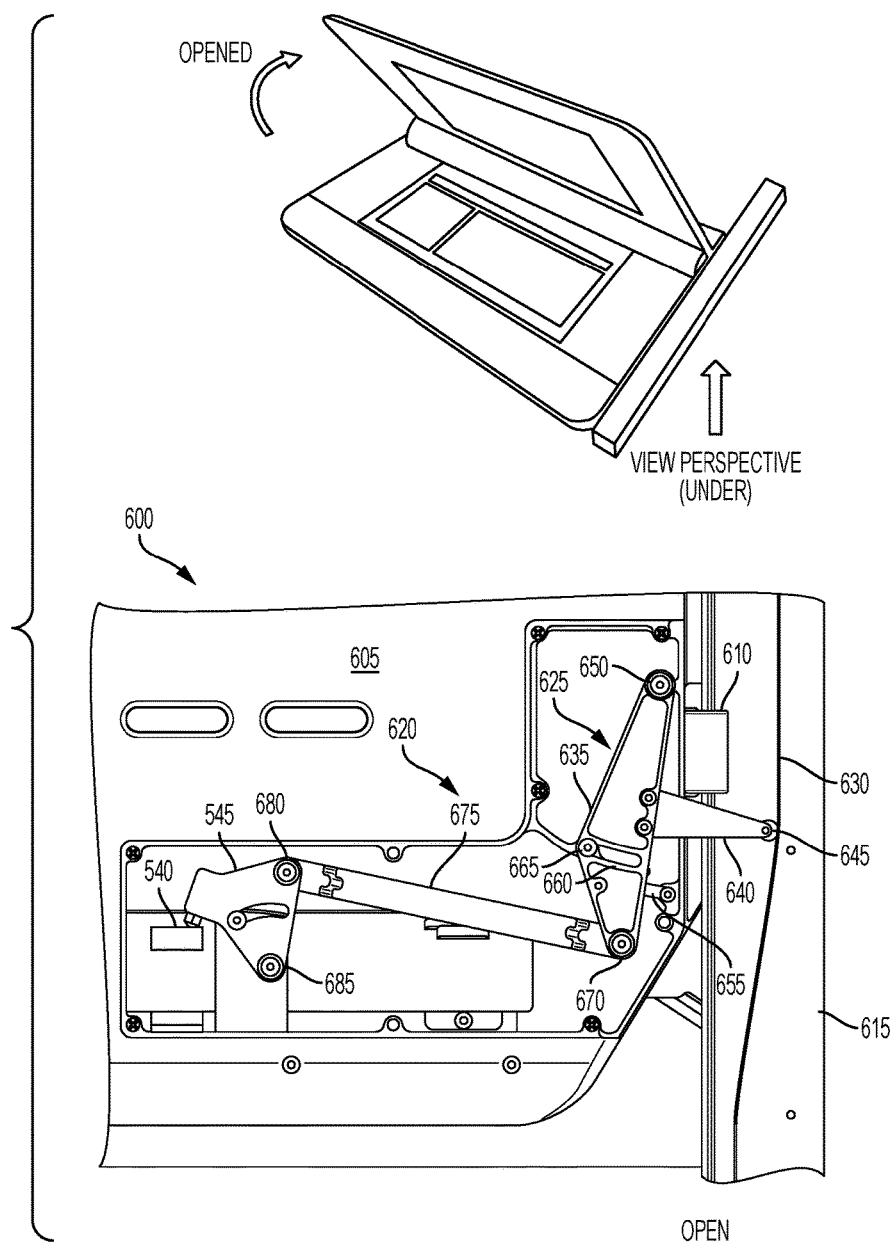
FIG. 6 depicts a bottom view of an exemplary multi-use aircraft tray table assembly, illustrating an automatic lid closing mechanism in the open state.

FIG. 6 depicts a bottom or underside view of an exemplary multi-use aircraft tray table assembly 600, which illustrates an automatic lid closing mechanism 620 (retractor) for a pivoting lid 505 in an open position. In some implementations, the multi-use aircraft tray table assembly 600 may include a tray table enclosure 605 that may define a lower portion of the tray table assembly 600. For example, the tray table enclosure 605 may be configured to house various components of the tray table assembly 600, such as the closing mechanism 620 and storage compartments. In some implementations, the tray table enclosure 605 may be mechanically coupled to a tray coupler 610 on a lateral edge of the tray table enclosure 605 that may be slidably engaged with a tray support rail 615. In some implementations, to translate the tray table assembly 600 toward the passenger into an extended position, the tray table enclosure 605 may be guided by the tray support rail 615, which may include a guide slot or track that engages the tray coupler 610 so that the tray table enclosure 605 can translate between the extended and retracted positions. In some implementations, the tray table assembly 600 may include a tray support rail 615 disposed on one or both sides of the tray enclosure 605.

In some examples, the multi-use aircraft tray table assembly 600 may further include an automatic lid closing mechanism 620 (retractor), which may be configured to protect items located above and/or behind an open pivoting cover, such as the pivoting lid 505 of FIG. 5, that may collide or make contact with the pivoting lid 505 in the open position. In some examples, the automatic lid closing mechanism 620 may cause closing of a pivoting cover within the multi-use aircraft tray table assembly 600, to prevent collisions of the open pivoting lid with items above or behind the open lid, such as a video display unit disposed within a rear surface of a seatback, when the multi-use aircraft tray table assembly 600 is articulated from a deployed position to a stowed position, such as against the rear surface of the seatback.

In some implementations, the automatic lid closing mechanism 620 may include a cantilever subassembly 625 (pivoting arm) that may be configured to engage the tray support rail 615 along a track 630. In some examples, a longitudinal position of the tray table enclosure 605 may define a position at which the cantilever subassembly 625 contacts the track 630. In addition, the position at which the cantilever subassembly 625 contacts the track 630 define a rotational position of the cantilever subassembly 625 with respect to the automatic lid closing mechanism 620. In some implementations, the cantilever subassembly 625 may include a cantilever body 635 that is fixedly attached to a cantilever extension arm 640 that extends laterally outward from the tray table enclosure 605 toward the tray support rail 615. The cantilever extension arm 640 may be rotatably coupled to a guide roller 645 at an end of the cantilever extension arm 640 adjacent to the track 630 that slidably rolls as the guide roller 645 engages the track 630.

In some examples, the cantilever subassembly 625 may pivot about a pivot point 650, which may be adjacent a proximal end of the cantilever body 635. In addition, the pivot point 650 may be anchored to the tray table enclosure 605. In some embodiments, the cantilever subassembly 625 may rotate about the pivot point 650 based on a position of the guide roller 645 at the end of the cantilever extension arm 640 along the track 630. For example, as the tray table enclosure 605 moves toward the retracted position (downward in FIG. 6), the guide roller 645 also moves downward along the track, causing clockwise rotation of the cantilever body. In one example, a bias spring 655 may be coupled on one end to a fixed point on the tray table enclosure 605 and coupled on the other end to a fixed point near an end opposite from the hinge 650) on the cantilever body 655. The bias spring 655 may provide a retention force necessary to bias the guide roller 645 in a dynamically engaged relationship with the track 630.

In some implementations, the cantilever subassembly 625 may include a travel limit slot 660 that may be slidably engaged with a travel limit stud 665. The travel limit slot 660 may provide a rotational travel limit for the cantilever subassembly 625 such that if the guide roller 645 becomes disengaged with the track 630, the system linkage relationships between components of the automatic lid closing mechanism 620 may remain in operational range of the track 630 without binding or becoming inverted. In an illustrative example, when the tray table enclosure 605 is removed from the tray support rails 615 for maintenance or replacement, the cantilever subassembly 625 may travel in a counterclockwise direction (as shown in FIG. 6), due to the retention force in the bias spring 655, until the travel limit slot 660 hits the travel limit stud 665. In this way, the cantilever extension arm 640 may be allowed to extend a limited distance, which may facilitate reassembly, for example.

On the distal end of the cantilever subassembly 625 is a distal pivot point 670 that may be hingedly coupled to a proximal end of a translation linkage 675. In addition, at the distal end of the translation linkage 675 is a distal pivot point 680 that may rotatably couple the translation linkage 675 to the cantilevered subassembly 645. In operation, translational motion of the translational linkage 675 caused by the cantilever subassembly 625 may impart a rotational motion to the cantilever subassembly 545, which is described above with reference to FIG. 5. In some implementations, the cantilever subassembly 545 may rotate about a pivot point 685, and the pivot point 685 may be rotatably coupled to a fixed point on the tray table enclosure 605. In one example, the rotational motion of the cantilever assembly 545 may drive a closing motion on the cover closing drive arm 540, thereby causing the cylindrical hinge 510 to articulate the pivoting lid 505 toward the closed position. In some examples, the cover closing drive arm 540 be part of a distal end of the pivoting cover of the multi-use aircraft tray table assembly 600 that may extend into the tray table enclosure 605. In operation, when a downward force, with respect to FIG. 6, is imparted upon the cover closing drive arm 540, the pivoting cover within the multi-use aircraft tray table assembly 600 may rotate toward the closed position.

In an illustrative example, when the tray table is pushed away from a passenger toward the retracted position (downward with respect to FIG. 6) the cantilever subassembly 625 may rotate in a clockwise direction (with respect to FIG. 6) imparting a counterclockwise motion (with respect to FIG. 6) on the cantilever subassembly 545 via the translation linkage 675 that pivots about pivot points 670 and 680. In some examples, the counterclockwise motion of the cantilever subassembly 545 may force the pivoting cover of the multi-use aircraft tray table assembly 600 to close, via operation of the cover closing drive arm 540. As the cantilever subassembly 625 pivots about the pivot point 650, twisting forces may be imposed upon the cantilever subassembly 625. In some examples, the travel limit slot 660, in conjunction with the travel limit stud 665, may provide planar stability to the cantilever subassembly 625.

Figure 7:
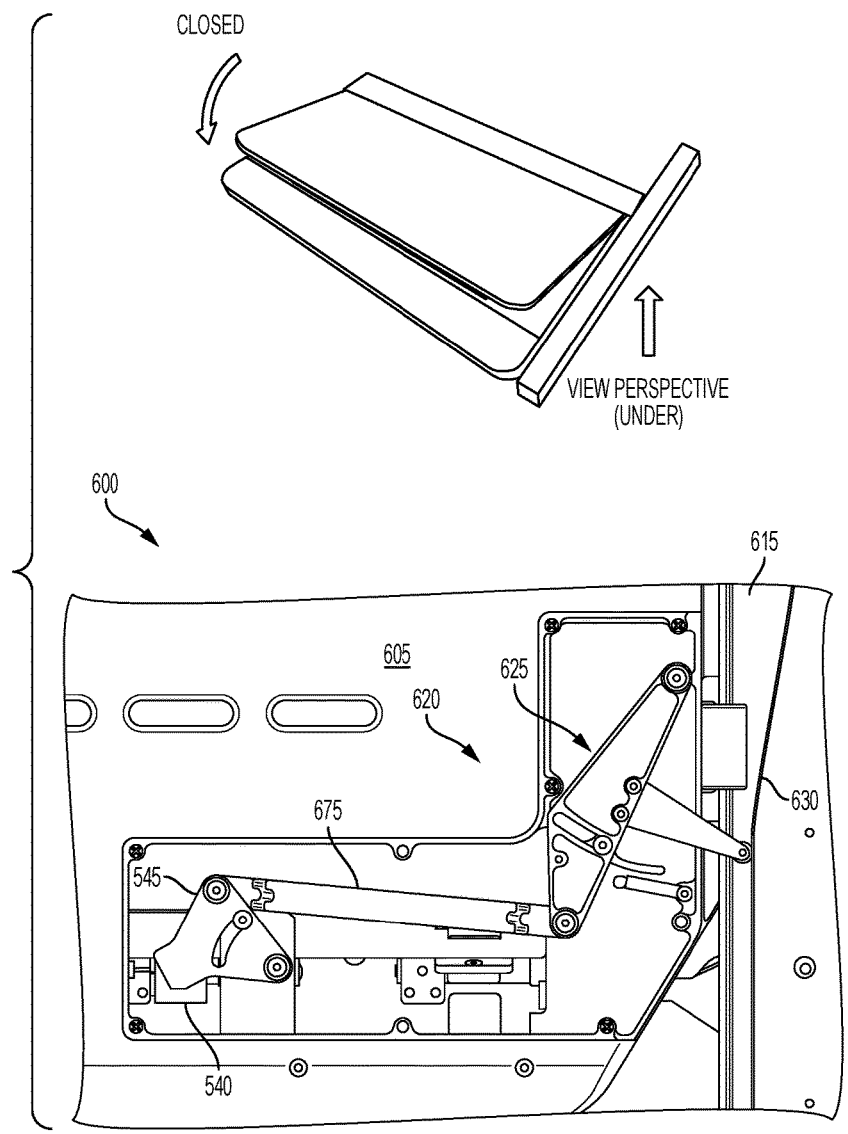
FIG. 7 depicts a bottom view of an exemplary multi-use aircraft tray table assembly, illustrating an automatic lid closing mechanism in the closed state.

FIG. 7 depicts a bottom or underside view of an exemplary multi-use aircraft tray table assembly 600, illustrating an automatic lid closing mechanism 620 in the closed position. In some implementations, the multi-use aircraft tray table assembly 600 may include the tray table enclosure 605, which includes the automatic lid closing mechanism 620 that includes the components described above. For example, the automatic lid closing mechanism 620 may include the cantilever subassembly 625. In some implementations, the cantilever subassembly 625 may engages the tray support rail 615, along the track 630. In operation, when a passenger pushes the tray table enclosure 605 away from themselves toward the retracted position, the cantilever subassembly 625 rides the track 630 downward (with respect to FIG. 7). As the cantilever subassembly 625 moves downward, the cantilever subassembly 625 also pivots clockwise (with respect to FIG. 7), which translates a force from the cantilever subassembly 625 to the translation linkage 675, thereby causing a counterclockwise motion (with respect to FIG. 7) of the cantilever subassembly 545. The counterclockwise rotation of the cantilever subassembly 545 then drives the cover closing drive arm 540 downward (with respect to FIG. 7), which imparts a motion on the cylindrical hinge (FIG. 5 reference 510) and closes the pivoting lid (FIG. 5 reference 505).

Although various embodiments have been described with reference to the figures, other embodiments are possible. For example, in some embodiments, the tray table support rails may be coupled beneath the tray table assembly, and may provide the same function as embodiments described above with respect to positioning the tray table support rails on the sides of the tray table assembly. In such embodiments, the lid closing mechanisms (retractors) may be translated toward the center of the table but may be operable to the same function. In various examples, the tray table support rails may include a single rail in the middle of the tray table. In a single tray table support rail embodiment, passengers may find benefit of additional lateral legroom.

In various examples, the lid closing mechanism (retractor) may cause closing of the pivoting lid when the tray table assembly is pushed away from a passenger toward a retracted position. In an operational example, when the tray table assembly is pulled toward a seated passenger toward an extended position, a position of the pivoting lid may not change, for example, the pivoting lid may stay closed. In this example, the passenger may advantageously use the tray table's horizontal surface, while the tray table is pulled close to the passenger in an extended position for other activities not requiring a mirror or a retaining compartment, such as when eating a meal.

In some embodiments, the finger lift cavity (for example, finger lift cavity 145 in FIG. 1) may be disposed along the front surface or edge of the pivoting lid. In some embodiments, the finger lift cavity may be disposed on either or both sides of the tray table assembly. In some examples, passengers may find benefit of the finger lift cavity disposed on both sides of the tray table for reasons of passenger hand favor. In some examples the finger lift cavity may be employed within the pivoting lid itself. In various examples, instead of a finger lift cavity, the pivoting lid lift mechanism may be a tab or a wing. In some embodiments, the pivoting lid lift mechanism may be a handle.

In various embodiments, the mirror may be detachable, which may advantageously allow a passenger to employ the mirror autonomously and apart from the tray table assembly. A detachable mirror may also provide service personnel a convenient means for repair.

In an illustrative embodiment, the hinging action of a storage compartment cover may be separate from a hinging action of the mirror. Passengers may find benefit for hinging an empty cover and retaining a solid work surface. For example, some business flyers may place self-adhesive notes on the inner part of the compartment cover which may act as a wall, while the work surface may be used for a notepad. In some examples where the hinging action of the storage compartment cover is separate from the hinging action of the mirror, a lighting surface may be fixedly attached to the storage compartment cover. In some examples a display unit may be fixedly attached into the compartment cover.

In some examples, the PED holder may be covered by a horizontal rubberized material, with a slit cut longitudinally down the middle. Passengers employing a PED may find an advantage in this embodiment, as it may allow a manual manipulation of a viewing angle of the PED. In addition, various examples of the horizontally rubberized PED holder may also include a rubberized interior portion of the PED holder groove.

In an illustrative exemplary embodiment, the entire table may be sliding, and may provide adjustability to the position of the PED and storage relative to the seat occupant. In some examples the mirror may be on one side of a hinged panel within the tray table, and may be operable to pivot to face the seat occupant, functioning as a vanity mirror.

In an exemplary embodiment, the tray table cover may be on a light duty dashpot, which may advantageously prevent slamming of the cover against the table, and may help keep the aircraft cabin quiet. In some examples the tray table cover may articulate to substantially 180°, which may advantageously provide a deeper longitudinal table surface. In some examples, the pivoting lid may be provided with a deployable privacy fabric. The privacy fabric may cover the lateral opening between the pivoting lid and the tray table, and may provide privacy to the user from passengers on either side.

In some illustrative embodiments, the tray sliding action may be power assisted. In such embodiments, a button along the front edge of the tray table may be provided to the passenger, actuation of which may provide a motor assisted stowing function. A passenger with their hands full, may find benefit in the automatic power assisted stowing function by actuating the stowage button with their knee or leg.

In some embodiments, the tray pivoting lid may employ a toggle latch mechanism. Passengers may push down on the tray pivoting lid, and the cover may pop-up partially to facilitate lifting the pivoting lid into the open position. When closing the pivoting lid, the passenger may articulate the pivoting lid downward toward the closed position and then press the pivoting lid into the table structure toggling and latching the lid in the closed position. Such a mechanism may be substituted for the finger lift cavity or may be provided in addition to the finger lift cavity.

In an exemplary illustration, some embodiments may employ additional cosmetic holding features adjacent to the storage container. Some passengers may find benefit in the additional holders, for example, cylindrical wells for lipstick or for mascara tubes.

In an exemplary embodiment, airline pillows may be sized and contain a pocket such that the tray table may fit inside the pocket within the pillow, thereby providing a mounting structure for the pillow. Passengers may find benefit in a pillow deployed in front of them, that is anchored laterally due to the pillow stitching.

In some embodiments, where a display takes the place of a mirror, a small camera may be mounted on or disposed within the tray pivoting lid facing the passenger when the lid is in the open position. The camera, in conjunction with the display, may provide a virtual mirror function. In such an embodiment, cabin designers may avoid design trade-offs of display functions versus mirror functions.

In some embodiments, with a deployed tray pivoting lid facing the passenger, speakers may be employed on lateral sides of the lid facing the passenger. An amplifier with controls may be integrated into the tray table assembly, as well as an audio input jack. Passengers may connect their PEDs to the audio jack with an audio cable and play audio programs, for example, music or podcasts. In some examples, the tray table may employ a wireless transceiver (e.g., Bluetooth) which may advantageously provide passengers wireless connection of their PEDs to the audio amplifier and speakers.

In certain examples, the hinging feature of the tray pivoting lid may employ a ball bearing, which may advantageously provide longer wear. In some examples, the bearing may be a plastic surface. In some examples, the lid may be on a ratchet mechanism, which may provide a long-lasting alternative to a friction hinge.

In an illustrative example, the width of the lid may be a portion of the complete lateral width of the tray table assembly. In some examples, more than one lid may be provided. Passengers may find an advantage in a multi-lid embodiment, for example, some passengers may employ one surface as a reading or writing surface with the lid closed, while using the lid opened side to monitor a child via the attached mirror. In some examples, a passenger enjoying a beverage may keep the beverage on the tray table, yet still deploy the tray pivoting lid with the vanity mirror to check his or her appearance.

In some implementations, the PED holder may be composed of a soft material, which may advantageously prevent PED breakage in situations where an edge of the PED is inserted within the PED holder and is accidentally cantilevered toward the lid. Materials for such an implementation may include, for example, foam rubber.

The cylindrical hinge coupled to the lid, in some examples, may employ a gasket. Providing a gasket for the hinge may advantageously provide ingress protection for an inner cavity of the tray table enclosure, such as from spilled beverages.

In various embodiments, airlines may use the storage containers within the tray tables as storage for beverage accoutrements, from napkins and stirrers to snacks or flavorings. Flight attendants may find advantage to storing items locally within the passenger tray table to reduce in-flight responsibilities.

In some embodiments, the PED holder may rotate about a vertical axis. Passengers may find advantage in the rotatable PED holder by rotating their display away from other passengers, or rotating to reduce glare from ambient or natural light.

In some embodiments, an interlock PED protection system may be configured to detect a PED within the PED holder slot and may disable the automatic closing of the lid when a PED is supported in the PED holder. For example, a mechanical displacement member (such as a bar) disposed within the slot of the PED holder may become depressed when a PED is inserted in the slot. In response to the displacement member being pressed, the displacement member may mechanically engage an interlock coupled to the closing drive arm 540, the cantilever subassembly 545, or the entire closing mechanism 550 (shown in FIG. 5), which may prevent pivoting lid 505 from articulating. In some embodiments, when the displacement member is pressed, it engages a latch which blocks an actuator (such as the cantilever subassembly 545) controlling the pivoting lid 505, thus preventing the pivoting lid 505 from articulating. In some embodiments, placing the PED within the slot of the PED holder may activate a mechanical switch or lever that prevents pivoting the lid toward the closed position. The mechanical switch or lever may actuate a linkage to brake an actuator controlling the lid when a user attempts to push the tray table assembly with a lid in the open position to the closed position. The interlock PED protection system thus may prevent damage to the PED or other item stored within the PED holder slot caused by unintended closing of the pivoting lid.

In some embodiments, when a PED is removed from the slot, the interlock PED protection system may allow for articulation of the lid. For example, the actuator controlling articulation of the lid may be biased to return to a state where the cover closing drive arm 540 can be forced to the left (with respect to FIG. 5), which drives the cylindrical hinge 510 clockwise (with respect to FIG. 5) to articulate the lid 505 to a closed position. Thus, the interlock PED protection system may permit the closing mechanism 550 to drive the pivoting lid 505 toward the closed position when the PED is removed from the PED holder slot.

In some embodiments, the interlock PED protection system may disable the retraction of the tray table assembly altogether. In some embodiments, the interlock PED protection system may catch on a guide to prevent the tray table from moving to a stowed position while the PED holder slot is occupied. In some embodiments, the interlock PED protection system may include a brake that interrupts the ability of the tray table to move. For example, the interlock PED protection system may be operably coupled to the tray slide 150 and/or the tray coupler 155 shown in FIG. 1, such that when a PED is inserted within the PED holder, any retraction of the tray table along the tray slide 150 may be disallowed. In some embodiments, the interlock PED protection system may be operably coupled to the tray support rail 615 and/or the track 630 shown in FIG. 6 to prevent retraction of the tray along the track 630 when the PED is stowed within the PED slot.

In some embodiments, detection of an object occupying a PED holder is accomplished via an electronic sensor, which triggers a mechanical stop to disallow automatically closing the lid. For example, an object occupying a PED holder may be detected using a weight sensor, such as a capacitive load sensor or a resistive load sensor. In some embodiments, an object occupying a PED holder may be detected using a pressure switch.

In some embodiments, the multi-use aircraft tray table assembly (such as the tray table described with respect to element 100 of FIG. 1, for example) may possess a sensor (or multiple sensors) for identifying that various personal items have been left in the tray table by a passenger. In some embodiments, the sensor may be an optical sensor. For example, a pair of optical sensors may be arranged across at least one stowage compartment and configured to initiate an alert upon detecting a break in the optical beam corresponding to items remaining in the tray table after stowing or upon landing. In some embodiments, a strain gauge may be used to detect the weight of an item left in the tray table. The strain gauge may have a gauge factor suited to measure objects of various weights. For example, a weight sensor may be located within the tray table that can detect an object lying in the compartments of the tray table, such as a watch or smart phone. The sensor(s), in some implementations, trigger an indicator light upon the tray table or disposed elsewhere in the passenger cabin, notifying the passenger that personal belongings may remain with the tray table. In some implementations, the sensor(s) may trigger an indicator lamp or graphical user interface warning visible to flight crew, alerting to detection of items stowed within the tray table.

In some embodiments, the tray table may be used for storing small items for passenger use within the compartments of the tray table. For example, a tray table may have a tissue compartment integrated within the tray table which stores tissues for passenger use. In some embodiments, the tray table may have a chocolate or mint dispenser compartment for passenger enjoyment. In some embodiments, the tray table may have a writing utensil compartment from which a user can access a pen or pencil for use during a flight. In some embodiments, the tray table may have moist towelettes with antimicrobial properties for disinfecting various surfaces of the passenger seat and/or a passenger's skin.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A multi-use tray table assembly for an aircraft, comprising:
    a support rail configured to provide a path for horizontal translation of a tray table between a use position and a stowage position;
    the tray table slideably engaged with the support rail, the tray table including
        a body enclosure housing a storage compartment disposed within an upper surface of the body enclosure, the storage compartment comprising a plurality of compartment wells configured to receive personal effects of a passenger, and an articulating panel coupled to the body enclosure by a hinge disposed along at least a portion of an edge of the body enclosure, wherein an inner surface of the articulating panel, in a closed position, is configured to abut the upper surface of the body enclosure such that the upper surface of the articulating panel forms a substantially smooth table top for the multi-use tray table assembly, and wherein the articulating panel, in an open position, is configured to provide the passenger access to the storage compartment, and wherein the articulating panel is in a substantially upright position such that the upper surface of the articulating panel is adjacent to a seatback of an adjacent seat forward of the passenger; and a retractor disposed within the body enclosure, the retractor configured to cause articulation of the articulating panel from the open position to the closed position as the tray table is translated from the use position to the stowage position, wherein the use position of the tray table assembly corresponds to a position in which the tray table is extended along the support rail toward the passenger while seated facing the tray table assembly; and wherein translating from the use position to the stowage position comprises translating the tray table horizontally along the support rail.

2. The tray table assembly of claim 1, wherein the edge of the body enclosure at which the hinge is disposed corresponds to a lateral edge of the body enclosure furthest from the passenger when seated facing the tray table assembly.

3. The tray table assembly of claim 1, wherein the articulating panel is configured to be manually moved between the open and closed positions in response to a rotational force manually applied by the passenger.

4. The tray table assembly of claim 1, further comprising a finger lift cavity disposed along a portion of an edge of the body enclosure, the finger lift cavity configured to allow the passenger to place at least one fingertip beneath the articulating panel to assist with moving the articulating panel from the closed position to the open position.

5. The tray table assembly of claim 1, wherein the stowage position of the tray table assembly corresponds to a position in which the tray table assembly is retracted along the support rail away from the passenger while seated facing the tray table assembly.

6. The tray table assembly of claim 1, further comprising a coupling device configured to couple the body enclosure to the support rail, the coupling device slideably engaged with the support rail to allow for horizontal translation of the body enclosure along the support rail.

7. The tray table assembly of claim 1, wherein a mirror is mounted to the inner surface of the articulating panel such that the mirror is viewable by the passenger when the articulating panel is in the open position.

8. The tray table assembly of claim 1, further comprising one or more surface panels disposed along lateral edges of the articulating panel, the one or more surface panels and the articulating panel forming the substantially smooth table top for the tray table assembly.

9. The tray table assembly of claim 1, wherein the storage compartment includes a holder for a personal electronic device (PED).

10. The tray table assembly of claim 9, wherein the holder includes a detent configured to receive an edge of the PED such that a screen of the PED is viewable by the passenger while seated facing the tray table assembly.

11. The tray table assembly of claim 1, wherein the hinge includes a drive arm extending below the upper surface of the body enclosure, the drive arm configured to transfer a closing force applied by the retractor to the hinge to cause articulation of the articulating panel from the open position to the closed position.

12. The tray table assembly of claim 1, wherein the support rail includes a guide member configured to slideably engage a mating slideable member of the retractor such that horizontal translation of the guide member along the track mechanism from the use position to the stowage position causes actuation of the retractor.

13. The tray table assembly of claim 12, wherein the retractor includes a plurality of pivoting arms, each of the plurality of pivoting arms hingedly attached to an adjacent pivoting arm at a pivot point such that each of the plurality of pivoting arms is configured to rotate about a respective pivot point in response to translation of the guide member along the track mechanism from the use position to the stowage position.

14. The tray table assembly of claim 13, wherein the retractor includes an extension arm fixed at a first end to a first pivoting arm of the plurality of pivoting arms and at a second end to the guide member such that translation of the guide member along the track mechanism causes rotation of the first pivoting arm.

15. The tray table assembly of claim 14, wherein the retractor includes a second pivoting arm of the plurality of pivoting arms linking the first pivoting arm to a cantilever member configured to cause articulation of the articulating panel from the open position to the closed position in response to horizontal translation of the guide member along the track mechanism from the use position to the stowage position.

16. The tray table assembly of claim 13, wherein the first pivoting arm includes a travel limit aperture configured to limit an amount of rotation of the first pivoting arm based on a position of a travel limit member within the travel limit aperture.

* * * * *